US012791701B2

(12) United States Patent
Al Jurdi et al.

(10) Patent No.: US 12,791,701 B2
(45) Date of Patent: Nov. 10, 2026

(54) METHOD AND APPARATUS FOR DEVICE-BASED INDOOR POSITIONING USING WI-FI FINE TIMING MEASUREMENTS

(71) Applicant: Samsung Electronics Co., Ltd., Suwon-si (KR)

(72) Inventors: Rebal Al Jurdi, Allen, TX (US); Hao Chen, Allen, TX (US); Boon Loong Ng, Plano, TX (US); Kyu-Hui Han, Suwon-si (KR); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 498 days.

(21) Appl. No.: 18/325,896

(22) Filed: May 30, 2023

(65) Prior Publication Data

US 2023/0408678 A1 Dec. 21, 2023

Related U.S. Application Data

(60) Provisional application No. 63/352,802, filed on Jun. 16, 2022.

(51) Int. Cl.
*H04W 64/00* (2009.01)
*G01S 13/76* (2006.01)
(Continued)

(52) U.S. Cl.
CPC ............ *G01S 13/878* (2013.01); *G01S 13/76* (2013.01); *H04W 64/00* (2013.01); *H04W 84/12* (2013.01)

(58) Field of Classification Search
CPC ...... G01S 13/878; G01S 13/76; G01S 13/765; G01S 5/0236; G01S 5/021;
(Continued)

(56) References Cited

U.S. PATENT DOCUMENTS

| | | |
|---|---|---|
| 8,185,129 B2 | 5/2012 | Alizadeh-Shabdiz |
| 9,549,386 B2 | 1/2017 | Venkatraman et al. |

(Continued)

FOREIGN PATENT DOCUMENTS

| | | |
|---|---|---|
| CN | 114173413 A | 3/2022 |
| JP | 2017208625 A * | 11/2017 |

(Continued)

OTHER PUBLICATIONS

International Search Report and Written Opinion issued Sep. 15, 2023 regarding International Application No. PCT/KR2023/008031, 9 pages.

(Continued)

*Primary Examiner* — Resha Desai
*Assistant Examiner* — Bongani Jabulani Mashele

(57) ABSTRACT

A method includes scanning for registered fine-time measurement (FTM)-enabled Wi-Fi nodes to generate a list of the FTM-enabled Wi-Fi nodes. The method also includes performing a ranging operation by (i) selecting nodes to range with from the list of the FTM-enabled Wi-Fi nodes and (ii) processing ranging responses from the selected nodes to generate distance measurements. The method further includes estimating a position of a device based on the distance measurements generated from the ranging operation.

20 Claims, 14 Drawing Sheets

(51) Int. Cl.
*G01S 13/87* (2006.01)
*H04W 84/12* (2009.01)

(58) Field of Classification Search
CPC ... G01S 2205/02; H04W 64/00; H04W 84/12; H04W 64/003
See application file for complete search history.

(56) References Cited

U.S. PATENT DOCUMENTS

| | | | |
|---|---|---|---|
| 9,648,466 | B2 | 5/2017 | Aström et al. |
| 9,736,809 | B2 | 8/2017 | Persson et al. |
| 9,769,626 | B2 | 9/2017 | Bajko et al. |
| 9,866,993 | B2 | 1/2018 | Das et al. |
| 10,341,807 | B2 | 7/2019 | Frenger et al. |
| 10,674,331 | B1 * | 6/2020 | Huang .................. H04W 4/023 |
| 10,880,673 | B2 | 12/2020 | Frenger et al. |
| 11,388,545 | B2 | 7/2022 | Frenger et al. |
| 2010/0135178 | A1 | 6/2010 | Aggarwal et al. |
| 2015/0045054 | A1 | 2/2015 | Emadzadeh et al. |
| 2015/0087328 | A1 | 3/2015 | Chao et al. |
| 2015/0105103 | A1 | 4/2015 | Dackefjord |
| 2015/0257120 | A1 | 9/2015 | Prechner et al. |
| 2015/0365805 | A1 * | 12/2015 | Bajko ................... G01S 13/878 455/456.1 |
| 2022/0030536 | A1 | 1/2022 | Issakov et al. |
| 2022/0039058 | A1 | 2/2022 | Raj et al. |
| 2022/0303932 | A1 | 9/2022 | Issakov et al. |
| 2023/0033044 | A1 | 2/2023 | Vegesna et al. |

FOREIGN PATENT DOCUMENTS

| | | | |
|---|---|---|---|
| KR | 10-2018-0039122 | A | 4/2018 |
| KR | 10-2022-0081797 | A | 6/2022 |
| WO | 2017026928 | A1 | 2/2017 |

OTHER PUBLICATIONS

Extended European Search Report issued Mar. 21, 2025 regarding Application No. 23824180.6, 11 pages.

Ibrahim et al., "Verification: Accuracy Evaluation of WiFi Fine Time Measurements on an Open Platform", Proceedings of the 24th Annual International Conference on Mobile Computing and Networking (MobiCom '18), Oct. 2018, pp. 417-427.

* cited by examiner

METHOD AND APPARATUS FOR DEVICE-BASED INDOOR POSITIONING USING WI-FI FINE TIMING MEASUREMENTS

CROSS-REFERENCE TO RELATED APPLICATION(S) AND CLAIM OF PRIORITY

This application claims priority under 35 U.S.C. § 119(e) to U.S. Provisional Patent Application No. 63/352,802 filed on Jun. 16, 2022, which is hereby incorporated by reference in its entirety.

TECHNICAL FIELD

This disclosure relates generally to wireless communications systems. Embodiments of this disclosure relate to methods and apparatuses for device-based indoor positioning using Wi-Fi fine timing measurements.

BACKGROUND

Indoor positioning has grown in popularity over the last decade in parallel with the growth in the number of personal wireless devices as well as wireless infrastructure. A variety of indoor positioning use cases include smart homes and buildings, surveillance, disaster management, industry and healthcare. All of these require wide availability and good accuracy. Most conventional positioning techniques suffer from one or more drawbacks, including inaccuracy, impracticality, and uncommonness. Ultra-wide band (UWB) wireless technology falls under this broad category. While UWB provides great accuracy, UWB transceivers for use as ranging anchor points are uncommon compared to Wi-Fi, which can be found in most commercial and residential spaces. Given the pervasiveness of Wi-Fi access points and devices, Wi-Fi positioning techniques have become strong contenders for indoor positioning.

SUMMARY

Embodiments of the present disclosure provide methods and apparatuses for device-based indoor positioning using Wi-Fi fine timing measurements.

In one embodiment, a method includes scanning for registered fine-time measurement (FTM)-enabled Wi-Fi nodes to generate a list of the FTM-enabled Wi-Fi nodes. The method also includes performing a ranging operation by (i) selecting nodes to range with from the list of the FTM-enabled Wi-Fi nodes and (ii) processing ranging responses from the selected nodes to generate distance measurements. The method further includes estimating a position of a device based on the distance measurements generated from the ranging operation.

In another embodiment, a device includes a transceiver and a processor operably connected to the transceiver. The processor is configured to: scan for registered FTM-enabled Wi-Fi nodes to generate a list of the FTM-enabled Wi-Fi nodes; perform a ranging operation by (i) selecting nodes to range with from the list of the FTM-enabled Wi-Fi nodes and (ii) processing ranging responses from the selected nodes to generate distance measurements; and estimate a position of the device based on the distance measurements generated from the ranging operation.

In another embodiment, a non-transitory computer readable medium includes program code that, when executed by a processor of a device, causes the device to: scan for registered FTM-enabled Wi-Fi nodes to generate a list of the FTM-enabled Wi-Fi nodes; perform a ranging operation by (i) selecting nodes to range with from the list of the FTM-enabled Wi-Fi nodes and (ii) processing ranging responses from the selected nodes to generate distance measurements; and estimate a position of the device based on the distance measurements generated from the ranging operation.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another or can operate as standalone schemes. Certain embodiments of the disclosure may be derived by utilizing a combination of several of the embodiments listed below. Also, it should be noted that further embodiments may be derived by utilizing a particular subset of operational steps as disclosed in each of these embodiments. This disclosure should be understood to cover all such embodiments.

Figure 1:
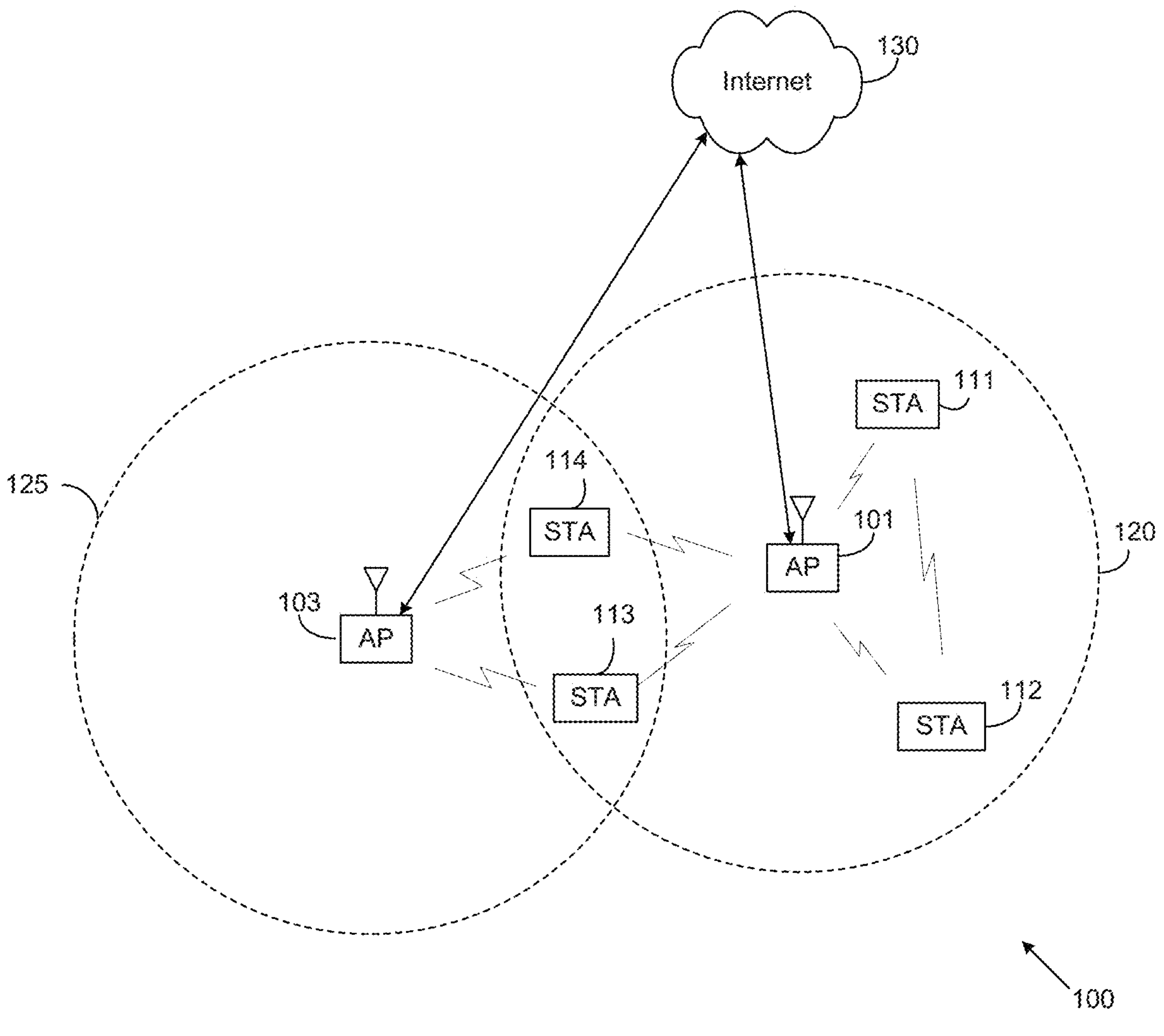
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using Wi-Fi or other WLAN communication techniques. The STAs 111-114 may communicate with each other using peer-to-peer protocols, such as Tunneled Direct Link Setup (TDLS).

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for facilitating device-based indoor positioning using Wi-Fi fine timing measurements. Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101 and 103 could communicate directly with the network 130 and provide STAs with direct wireless broadband access to the network 130. Further, the APs 101 and/or 103 could provide access to other or additional external networks, such as external telephone networks or other types of data networks.

Figure 2A:
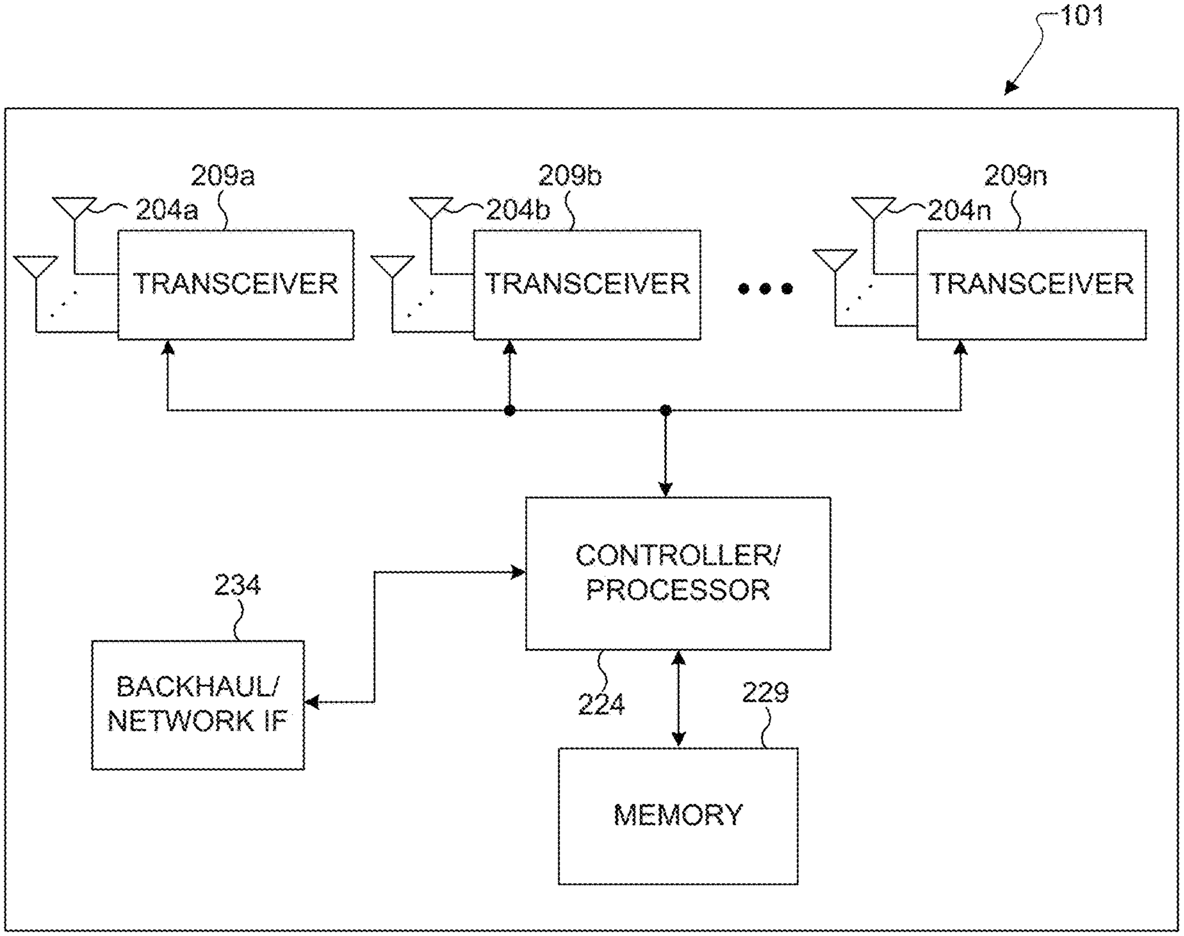
FIG. 2A illustrates an example AP according to various embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204*a*-204*n* and multiple transceivers 209*a*-209*n*. The AP 101 also includes a controller/processor 224, a memory 229, and a backhaul or network interface 234. The transceivers 209*a*-209*n* receive, from the antennas 204*a*-204*n*, incoming radio frequency (RF) signals, such as signals transmitted by STAs 111-114 in the network 100. The transceivers 209*a*-209*n* down-convert the incoming RF signals to generate IF or baseband signals. The IF or baseband signals are processed by receive (RX) processing circuitry in the transceivers 209*a*-209*n* and/or controller/processor 224, which generates processed baseband signals by filtering, decoding, and/or digitizing the baseband or IF signals. The controller/processor 224 may further process the baseband signals.

Transmit (TX) processing circuitry in the transceivers 209*a*-209*n* and/or controller/processor 224 receives analog or digital data (such as voice data, web data, e-mail, or interactive video game data) from the controller/processor 224. The TX processing circuitry encodes, multiplexes, and/or digitizes the outgoing baseband data to generate processed baseband or IF signals. The transceivers 209*a*-209*n* up-converts the baseband or IF signals to RF signals that are transmitted via the antennas 204*a*-204*n*.

The controller/processor 224 can include one or more processors or other processing devices that control the overall operation of the AP 101. For example, the controller/processor 224 could control the reception of forward channel signals and the transmission of reverse channel signals by the transceivers 209*a*-209*n* in accordance with well-known principles. The controller/processor 224 could support additional functions as well, such as more advanced wireless communication functions. For instance, the controller/processor 224 could support beam forming or directional routing operations in which outgoing signals from multiple antennas 204*a*-204*n* are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including facilitating device-based indoor positioning using Wi-Fi fine timing measurements. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for facilitating device-based indoor positioning using Wi-Fi fine timing measurements. Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. Alternatively, only one antenna and transceiver path may be included, such as in legacy APs. Also, various components in FIG. 2A could be combined, further subdivided, or omitted and additional components could be added according to particular needs.

Figure 2B:
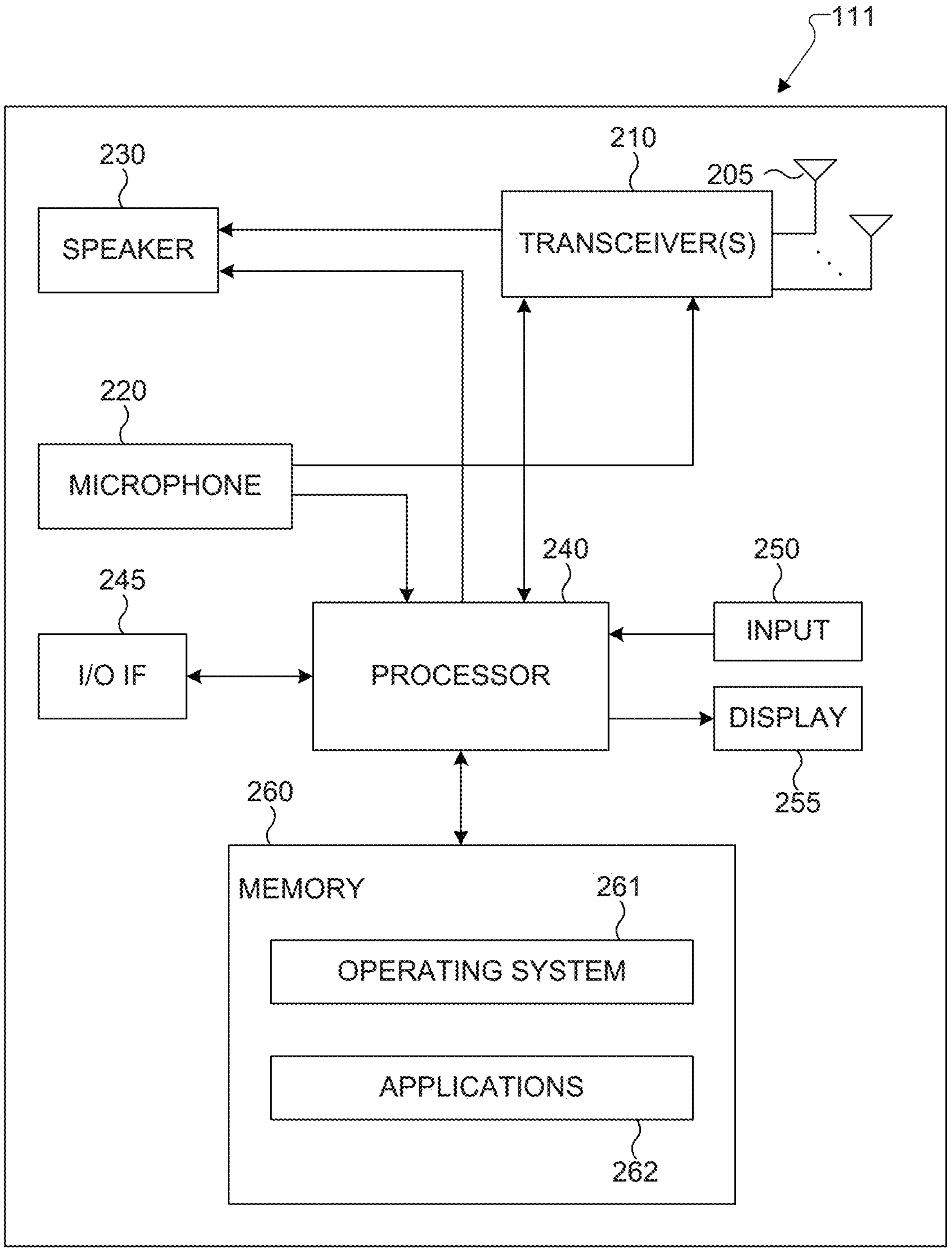
FIG. 2B illustrates an example STA according to various embodiments of the present disclosure.

FIG. 2B illustrates an example STA 111 according to various embodiments of the present disclosure. The embodiment of the STA 111 illustrated in FIG. 2B is for illustration only, and the STAs 111-115 of FIG. 1 could have the same or similar configuration. However, STAs come in a wide variety of configurations, and FIG. 2B does not limit the scope of this disclosure to any particular implementation of a STA.

The STA 111 includes antenna(s) 205, transceiver(s) 210, a microphone 220, a speaker 230, a processor 240, an input/output (I/O) interface (IF) 245, an input 250, a display 255, and a memory 260. The memory 260 includes an operating system (OS) 261 and one or more applications 262.

The transceiver(s) 210 receives from the antenna(s) 205, an incoming RF signal (e.g., transmitted by an AP 101 of the network 100). The transceiver(s) 210 down-converts the incoming RF signal to generate an intermediate frequency (IF) or baseband signal. The IF or baseband signal is processed by RX processing circuitry in the transceiver(s) 210 and/or processor 240, which generates a processed baseband signal by filtering, decoding, and/or digitizing the baseband or IF signal. The RX processing circuitry sends the processed baseband signal to the speaker 230 (such as for voice data) or is processed by the processor 240 (such as for web browsing data).

TX processing circuitry in the transceiver(s) 210 and/or processor 240 receives analog or digital voice data from the microphone 220 or other outgoing baseband data (such as web data, e-mail, or interactive video game data) from the processor 240. The TX processing circuitry encodes, multiplexes, and/or digitizes the outgoing baseband data to generate a processed baseband or IF signal. The transceiver (s) 210 up-converts the baseband or IF signal to an RF signal that is transmitted via the antenna(s) 205.

The processor 240 can include one or more processors and execute the basic OS program 261 stored in the memory 260 in order to control the overall operation of the STA 111. In one such operation, the processor 240 controls the reception of forward channel signals and the transmission of reverse channel signals by the transceiver(s) 210 in accordance with well-known principles. The processor 240 can also include processing circuitry configured to facilitate device-based indoor positioning using Wi-Fi fine timing measurements. In some embodiments, the processor 240 includes at least one microprocessor or microcontroller.

The processor 240 is also capable of executing other processes and programs resident in the memory 260, such as operations for facilitating device-based indoor positioning using Wi-Fi fine timing measurements. The processor 240 can move data into or out of the memory 260 as required by an executing process. In some embodiments, the processor 240 is configured to execute a plurality of applications 262, such as applications for facilitating device-based indoor positioning using Wi-Fi fine timing measurements. The processor 240 can operate the plurality of applications 262 based on the OS program 261 or in response to a signal received from an AP. The processor 240 is also coupled to the I/O interface 245, which provides STA 111 with the ability to connect to other devices such as laptop computers and handheld computers. The I/O interface 245 is the communication path between these accessories and the processor 240.

The processor 240 is also coupled to the input 250, which includes for example, a touchscreen, keypad, etc., and the display 255. The operator of the STA 111 can use the input 250 to enter data into the STA 111. The display 255 may be a liquid crystal display, light emitting diode display, or other display capable of rendering text and/or at least limited graphics, such as from web sites. The memory 260 is coupled to the processor 240. Part of the memory 260 could include a random-access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

As discussed above, indoor positioning has grown in popularity over the last decade in parallel with the growth in the number of personal wireless devices as well as wireless infrastructure. A variety of indoor positioning use cases include smart homes and buildings, surveillance, disaster management, industry and healthcare. All of these require wide availability and good accuracy. Most conventional positioning techniques suffer from one or more drawbacks, including inaccuracy, impracticality, and uncommonness. Ultra-wide band (UWB) wireless technology falls under this broad category. While UWB provides great accuracy, UWB transceivers for use as ranging anchor points are uncommon compared to Wi-Fi, which can be found in most commercial and residential spaces. Given the pervasiveness of Wi-Fi access points and devices, Wi-Fi positioning techniques have become strong contenders for indoor positioning. In particular, Wi-Fi round-trip time (RTT) has arguably become the strongest contender for indoor positioning. Furthermore, Wi-Fi RTT standardizes the Fine Timing Measurement (FTM) mechanism for accurate ranging.

Fine Timing Measurement (FTM) is a wireless network management procedure, defined in IEEE 802.11-2016 (unofficially known to be defined under 802.11mc), that allows a Wi-Fi station (STA) to accurately measure the distance from other Wi-Fi nodes (e.g., STAs or APs) by measuring the RTT between the two.

In an example where a STA measures its distance from other STAs, a STA wanting to localize itself (known as the initiating STA) with respect to other STAs (known as responding STAs) schedules an FTM session during which the STAs exchange messages and measurements. The FTM session includes three phases: negotiation, measurement, and termination.

Figure 3:
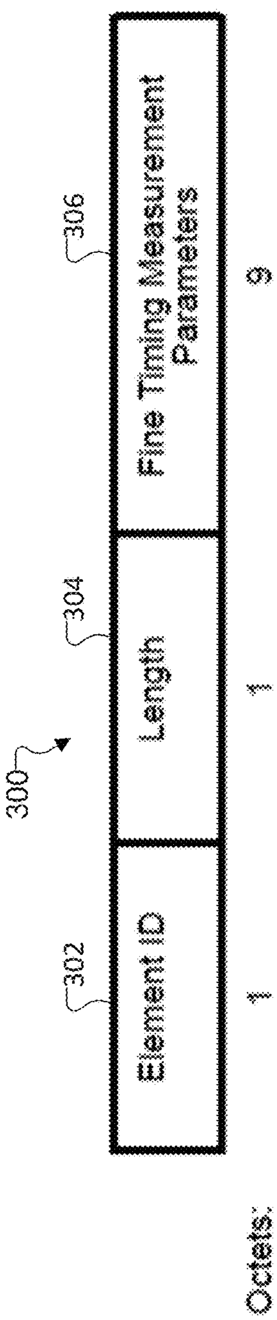
FIG. 3 illustrates the format of the FTM Parameters element provided in IEEE 802.11-2016.
Figure 4:
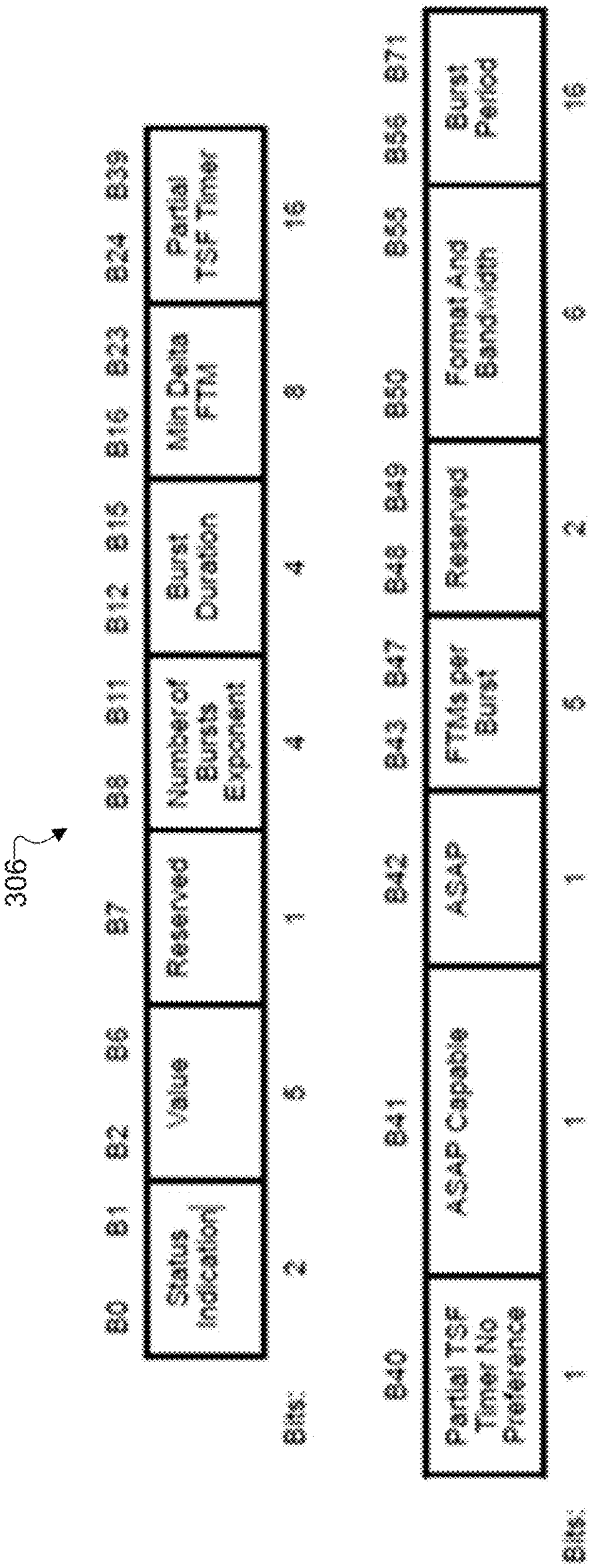
FIG. 4 illustrates the format of the FTM Parameters field provided in IEEE 802.11-2016.

In the negotiation phase, the initiating STA negotiates key parameters with the responding STA, such as frame format and bandwidth, number of bursts, burst duration, the burst period, and the number of measurements per burst. The negotiation starts when the initiating STA sends an FTM Request frame (a Management frame with subtype Action) called Initial FTM Request frame to the responding STA. The Initial FTM Request frame contains the negotiated parameters and their values in the frame's FTM Parameters element. The responding STA responds with an FTM frame called Initial FTM frame, which either approves of or overwrites the parameter values proposed by the initiating STA. FIG. 3 illustrates the format of the FTM Parameters element provided in IEEE 802.11-2016. As shown in FIG. 3, the FTM Parameters element 300 includes an element ID 302, a length 304, and a FTM Parameters field 306. FIG. 4 illustrates the format of the FTM Parameters field 306 provided in IEEE 802.11-2016.

Figure 5:
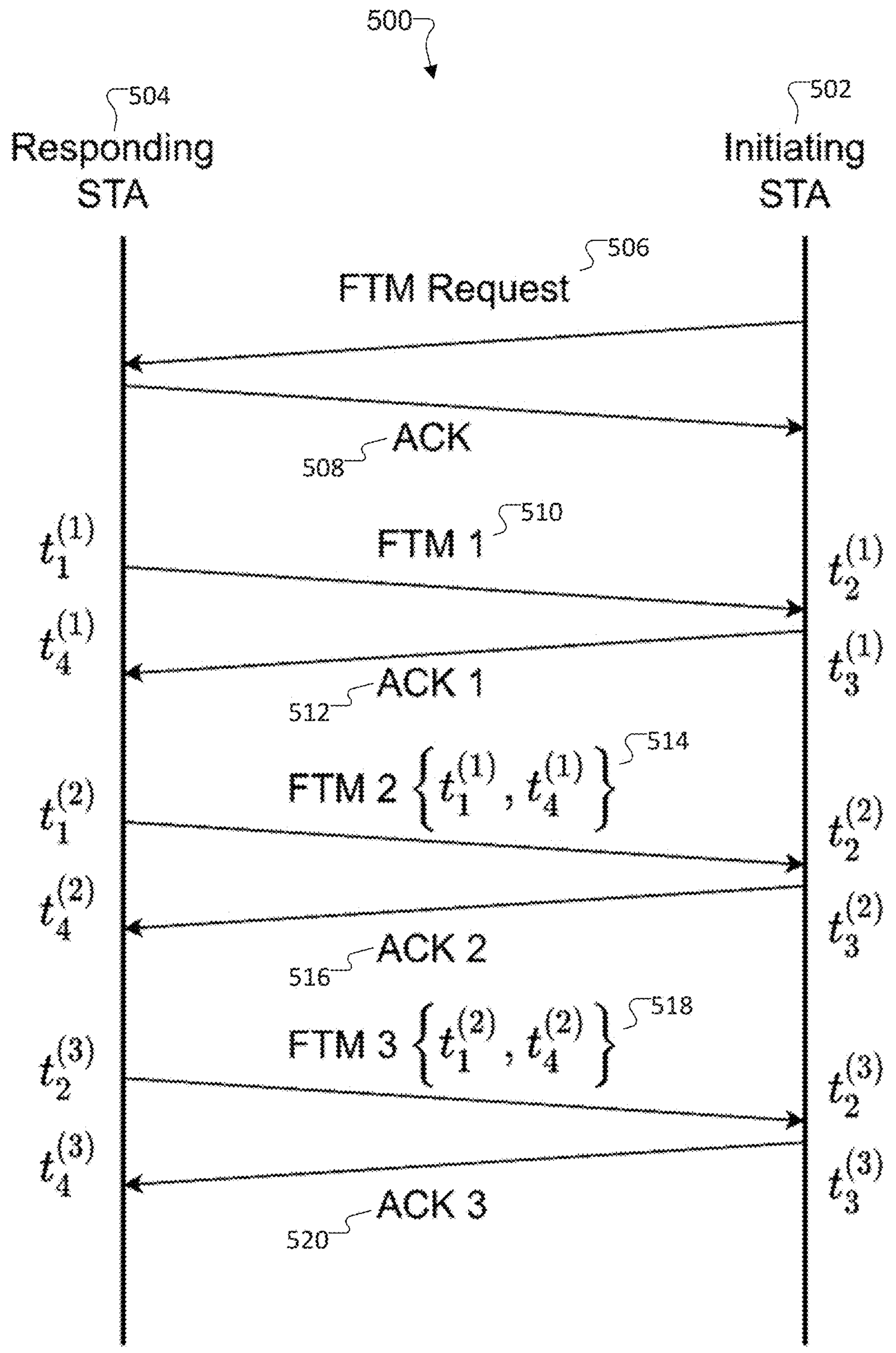
FIG. 5 illustrates an example measurement phase of an FTM session comprising one burst and 3 measurements (FTMs) per burst according to various embodiments of the present disclosure.

The measurement phase includes one or more bursts, and each burst includes one or more Fine Time measurements. The duration of a burst and the number of measurements therein are defined by the parameters Burst Duration and FTMs Per Burst. The bursts are separated by an interval defined by the parameter Burst Duration. FIG. 5 illustrates an example measurement phase 500 of an FTM session comprising one burst and 3 measurements (FTMs) per burst according to various embodiments of the present disclosure.

As shown in FIG. 5, the initiating STA (I-STA) 502 sends an Initial FTM Request frame 506 to the responding STA (R-STA) 504, triggering the start of the FTM session. The R-STA 504 responds with an ACK 508.

The R-STA 504 then sends the first FTM frame 510 to the I-STA 502 and captures the time it is sent $$t_1^{(1)}.$$

Upon receiving the first FTM frame 510, the I-STA 502 captures the time it was received $$t_2^{(1)}.$$

The I-STA 502 responds with an ACK 512, and captures the time it is sent $$t_3^{(1)}.$$

Upon receiving the ACK 512, the R-STA 504 captures the time it was received $$t_4^{(1)}.$$

The R-STA 504 sends a second FTM frame 514 to the I-STA 502 and captures the time it is sent $$t_1^{(2)}.$$

The purpose of the second FTM frame 514 is twofold: First, the second FTM frame 514 is a follow-up to the first FTM frame 510, i.e., it is used to transfer the timestamps $$t_1^{(1)}$$

and $$t_4^{(1)}$$

recorded by the R-STA 504. Second, the second FTM frame 514 starts a second measurement. Upon receiving the second FTM frame 514, the I-STA 502 extracts the timestamps $$t_1^{(1)} \text{ and } t_4^{(1)}$$

and computes the RTT according to the following equation:

$$RTT = \left(t_4^{(1)} - t_1^{(1)}\right) - \left(t_3^{(1)} - t_2^{(1)}\right).$$

The I-STA 502 also responds with an ACK 516, and captures the time the second FTM frame 514 was received $$t_2^{(2)}.$$

The two STAs 502 and 504 continue exchanging FTM frames and ACKs for as many measurements as has been negotiated between the two. In the measurement phase 500, this includes a third FTM frame 518 and a third ACK 520.

In order to be useful for positioning and proximity apps, the RTT between the two STAs can be translated into a distance, such as by the following equation:

$$d = \frac{RTT}{2}c.$$

where d is the distance between the two STAs and c is the speed of light.

Each FTM of the burst will yield a distance sample, with multiple distance samples per burst. Given multiple FTM bursts and multiple measurements per burst, the distance samples can be combined in different ways to produce a representative distance measurement. For example, the mean distance, the median distance, or some other percentile of distance can be reported. Furthermore, other statistics (e.g., the standard deviation) could be reported as well to be used by the positioning algorithm.

Trilateration

Figure 6:
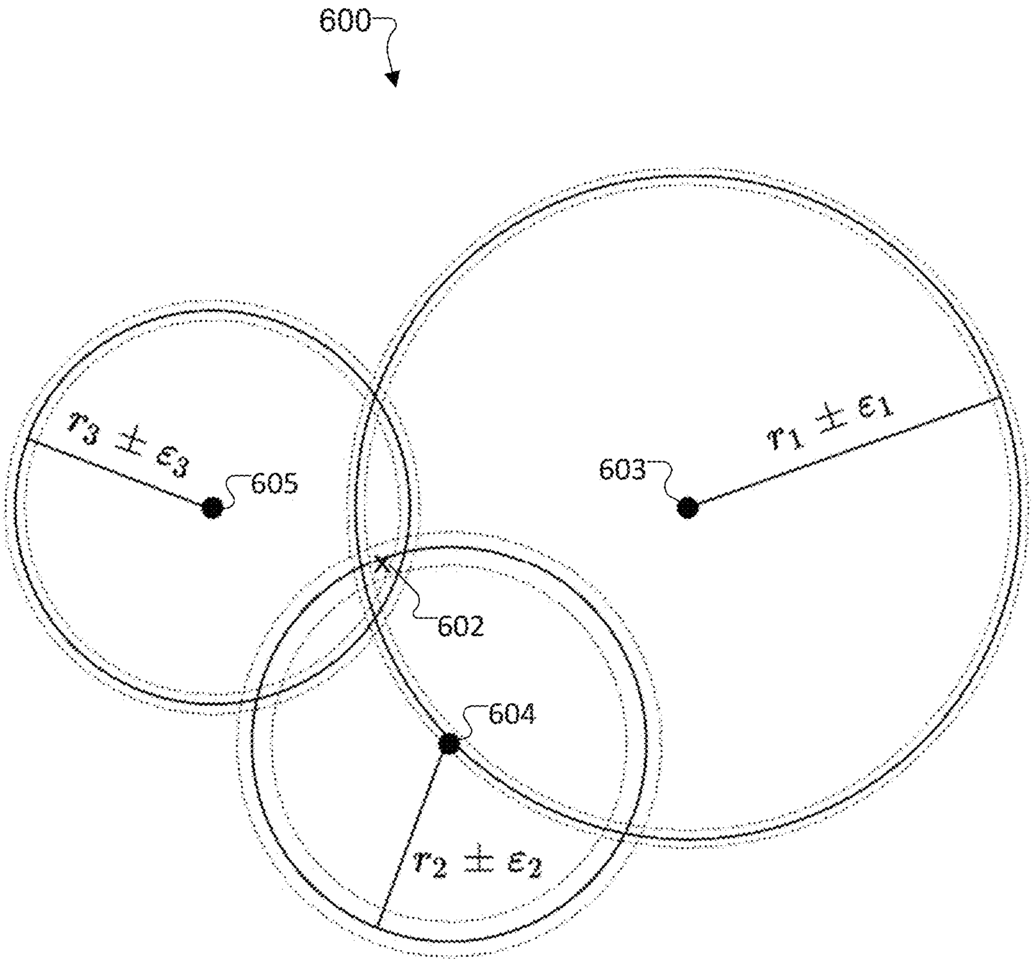
FIG. 6 illustrates an example of trilateration according to various embodiments of the present disclosure.

FIG. 6 illustrates an example 600 of trilateration according to various embodiments of the present disclosure. Trilateration is a method to determine the position of an object 602, in space or on a plane, using distances, or ranges, between the object 602 and three or more (multi-lateration) reference points or anchor points 603-605 with known locations. The distance between the object 602 and an anchor point 603-605 can be measured directly or indirectly as a physical quantity of time that is then converted into a distance. Two examples of such physical quantities are the time of flight of a radio signal from the anchor point 603-605 to the object 602 (or the opposite), and the round-trip time between the anchor point 603-605 and the object 602. In FIG. 6, since there are three ranges, one with every anchor point 603-605, the position of the object 602 is determined as the intersection of three circles, each centered at one of the three anchor points 603-605.

There are many ways to solve the problem mathematically, employing both linear and non-linear methods. One common method is to define a non-linear least squares problem with the following objective function:

$$F(p) = F(x, y, z) = \sum_{a=1}^{A} f_a^2(p),$$

where $f_a$(p) is the distance between the object, currently at a position p, and anchor point a. The position p* would then be obtained by minimizing the objective function F(p) using general methods, e.g., Gauss-Newton or Levenberg-Marquardt.

While trilateration is an intuitive technique to derive an object's position from ranging measurements, the resulting positioning accuracy under trilateration is highly sensitive to the ranging accuracy. For example, RTT distances (i.e., distances obtained through FTM) can suffer from low precision and low accuracy, with the latter leading to a steady shift in the estimated position if the distance measurements remain biased for an extended period of time. When trilateration also ignores temporal correlation across a sequence of measurements and their underlying positions, its performance pales in comparison to that of probabilistic approaches that estimate position over time from measurements coupled with an underlying motion model, e.g., Bayesian filtering, and more specifically, Kalman filtering.

Even though Wi-Fi RTT is a promising technology that marries the ubiquity of Wi-Fi with the accurate ranging techniques of position-centric technologies like UWB, there remains a set of challenging problems facing accurate and smooth positioning. First, as discussed above, Wi-Fi RTT measurement can suffer from both low precision and low accuracy, with the latter leading to a steady shift in position that may be difficult to detect and overcome. Second, ranging with all discovered APs can reduce the measurement rate leading to abrupt changes in position estimates. Third, the APs go in and out of range as the user moves in and out of their coverage areas, so making ranging requests to an AP outside of its coverage area can crowd the wireless channel with wasteful frames.

To address these and other issues, this disclosure provides systems and methods for device-based indoor positioning using Wi-Fi fine timing measurements. As described in more detail below, the disclosed embodiments provide a complete, commercial-grade device-based indoor positioning technique that uses Wi-Fi RTT to localize participating Wi-Fi devices. In some embodiments, the disclosed indoor positioning technique can be used as a computational arm of a comprehensive indoor positioning system (IPS), which includes infrastructure such as Wi-Fi APs with known location. Some of the advantages of the disclosed indoor positioning technique is higher positional accuracy and higher positional precision (e.g., compared to current WiFi RTT measurements).

Note that while some of the embodiments discussed below are described in the context of smart phones, these are merely examples. It will be understood that the principles of this disclosure may be implemented in any number of other suitable contexts or systems, including other portable electronic devices (e.g., tablets, laptops, and the like).

Figure 7:
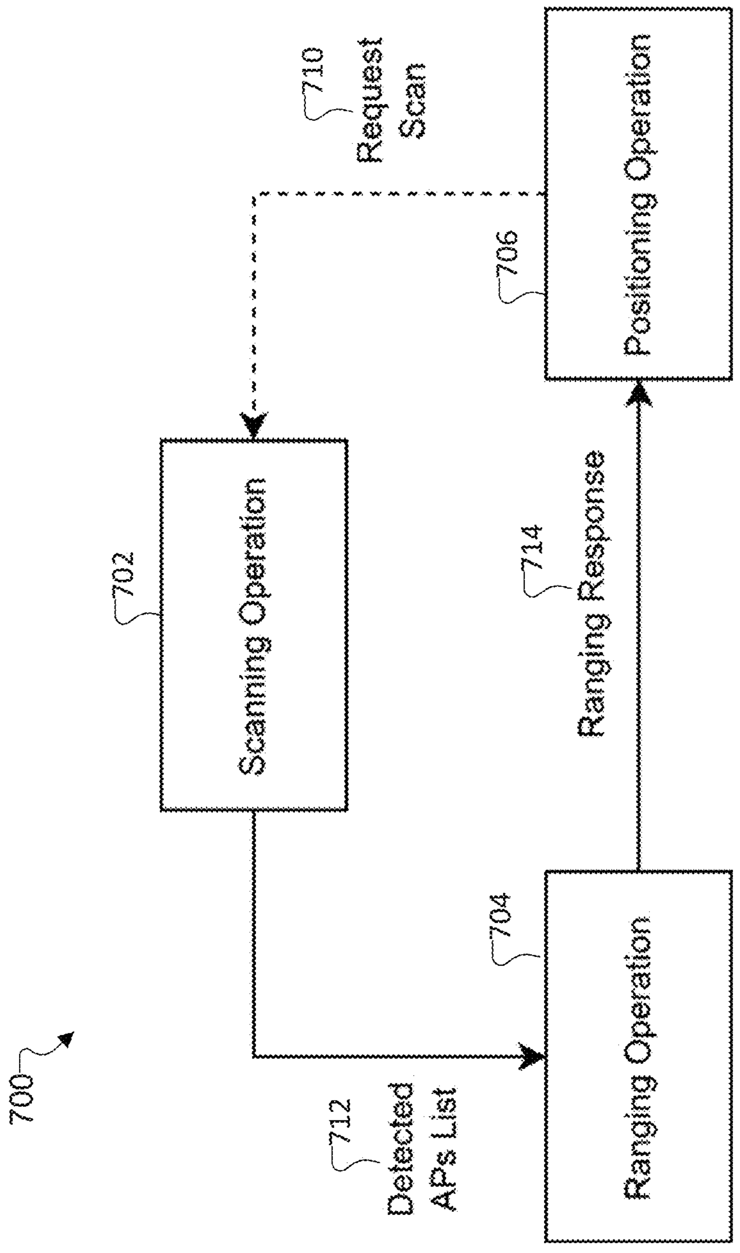
FIG. 7 illustrates an example process for device-based indoor positioning according to various embodiments of the present disclosure.

FIG. 7 illustrates an example process 700 for device-based indoor positioning according to various embodiments of the present disclosure. The embodiment of the process 700 shown in FIG. 7 is for illustration only. Other embodiments of the process 700 could be used without departing from the scope of this disclosure. For ease of explanation, the process 700 will be described as being implemented in the STA 111 of FIG. 1. However, the process 700 could be implemented in any other suitable device.

Depending on the implementation, various elements of the process 700 can be implemented in software, firmware, hardware, or a combination of two or more of these. In software, various elements of the process 700 can be implemented as an application, or app, deployed on the STA 111, which can be a Wi-Fi-capable device (e.g., a smart phone or tablet) that a user can interact with. Additionally or alternatively, various elements of the process 700 can be implemented as a service running in the background that provides, through an API with a service, the device position in this case. Additionally or alternatively, various elements of the process 700 can be deployed in the cloud or on a server where it communicates inputs (measurements) and outputs (position estimates) with the STA 111 over an internet connection (e.g., over Wi-Fi or the cellular network). Various elements of the process 700 can additionally or alternatively be implemented in firmware or hardware, as long as an API with the Wi-Fi MAC layer exists to send and receive ranging requests.

The process 700 combines three high-level operations that may run in sequence or in parallel. The three operations include a scanning operation 702, a ranging operation 704, and a positioning operation 706. In the scanning operation 702, the STA 111 periodically scans for registered FTM responders, i.e., FTM-enabled anchor points (such as APs), to build or refresh a detected APs list 712, which is a list of available APs to range with. The scanning operation 702 may be performed in response to a scan request 710. In the ranging operation 704, the STA 111 selects APs to range with from the detected APs list 712, periodically builds and makes ranging requests, and processes ranging responses 714 to extract key information (e.g., RTT/distance, RTT/distance standard deviation, and RSSI). In the positioning operation 706, the STA 111 estimates the position of the STA 111 from distance measurements. Further details about each of the operations 702, 704, 706 are provided below.

Scanning Operation 702.

Figure 8:
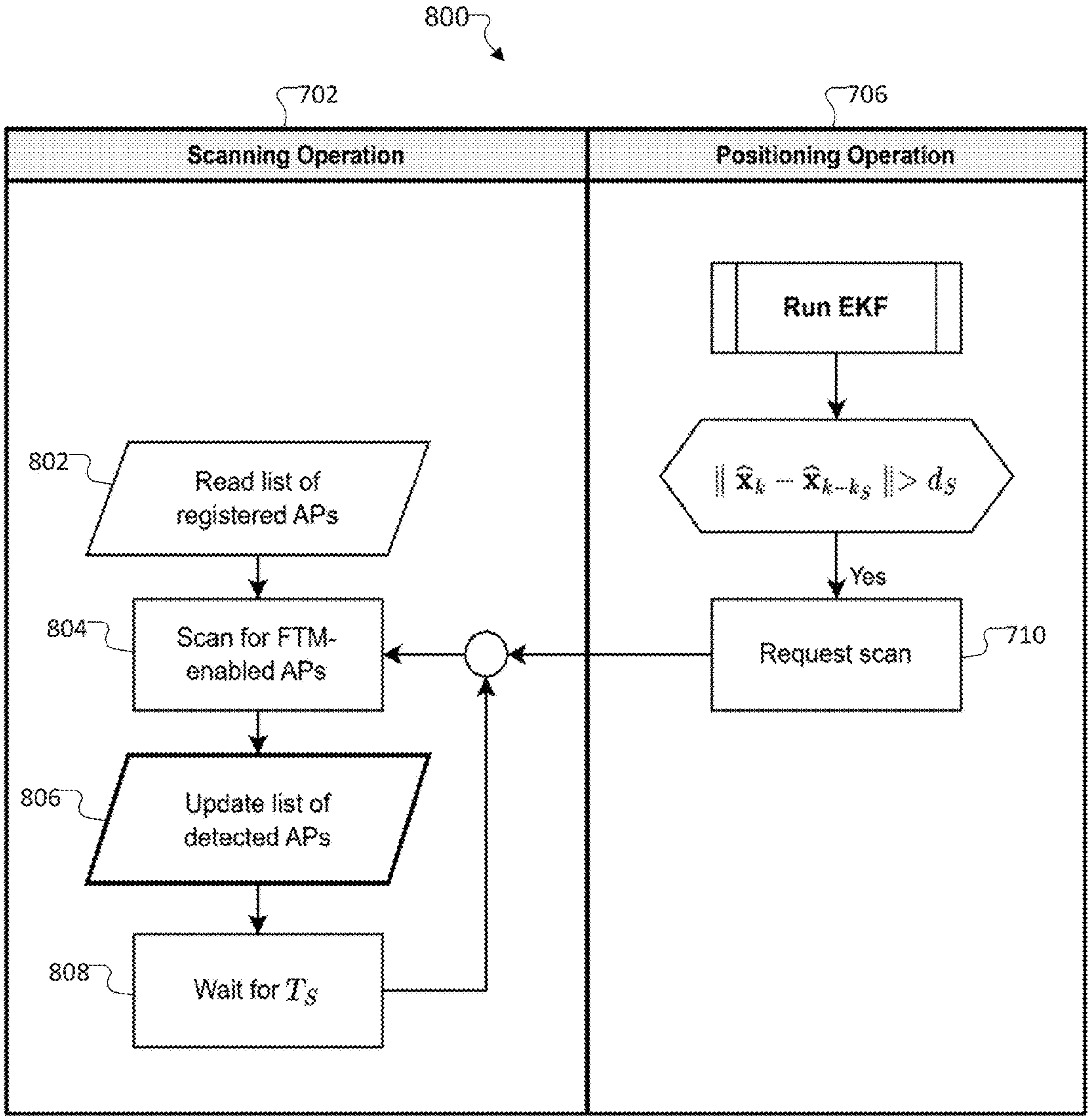
FIG. 8 illustrates an example flow chart showing a scanning operation and its interaction with a positioning operation, according to various embodiments of the present disclosure.

FIG. 8 illustrates an example flow chart 800 showing the scanning operation 702 and its interaction with the positioning operation 706, according to various embodiments of the present disclosure. As discussed above, a purpose of the scanning operation 702 is to detect APs to range with as the STA 111 moves around.

As shown in FIG. 8, the scanning operation 702 starts with operation 802, which can correspond to the startup of the process 700. At operation 802, the STA 111 reads a list of registered APs. The list limits the set of FTM responders to those deployed by the operator of the indoor positioning system for the purpose of positioning. Afterwards (and, in some embodiments, for the entire lifetime of the app), the STA 111 performs the following operations in the following order:

At operation 804, the STA 111 scans for, and detects, FTM responders (i.e., FTM-enabled APs) in the vicinity. The FTM responders may advertise support for FTM by setting to true the Fine Timing Measurement Responder field of the Extended Capabilities element in their beacon frames.

At operation 806, the STA 111 intersects the set of registered FTM APs, which has a size A, with the set of detected FTM responders to produce or update the detected APs list 712. The detected APs list 712 includes the set of detected FTM responders, or detected APs, which has a size $A_S \leq A$.

At operation 808, the STA 111 waits for a scanning period $T_S$ before going back to operation 804. In some instances, the STA 111 returns to operation 804 before the wait timer runs out (i.e., before the scanning period $T_s$ expires). For example, the STA 111 may immediately jump to operation 804 if the STA 111 receives an external scan request 710, such as from the positioning operation 706, upon the detection of a significant and rapid change in position of the STA 111. Other steps performed by the positioning operation 706 are discussed in further detail below.

Ranging Operation 704.

Figure 9:
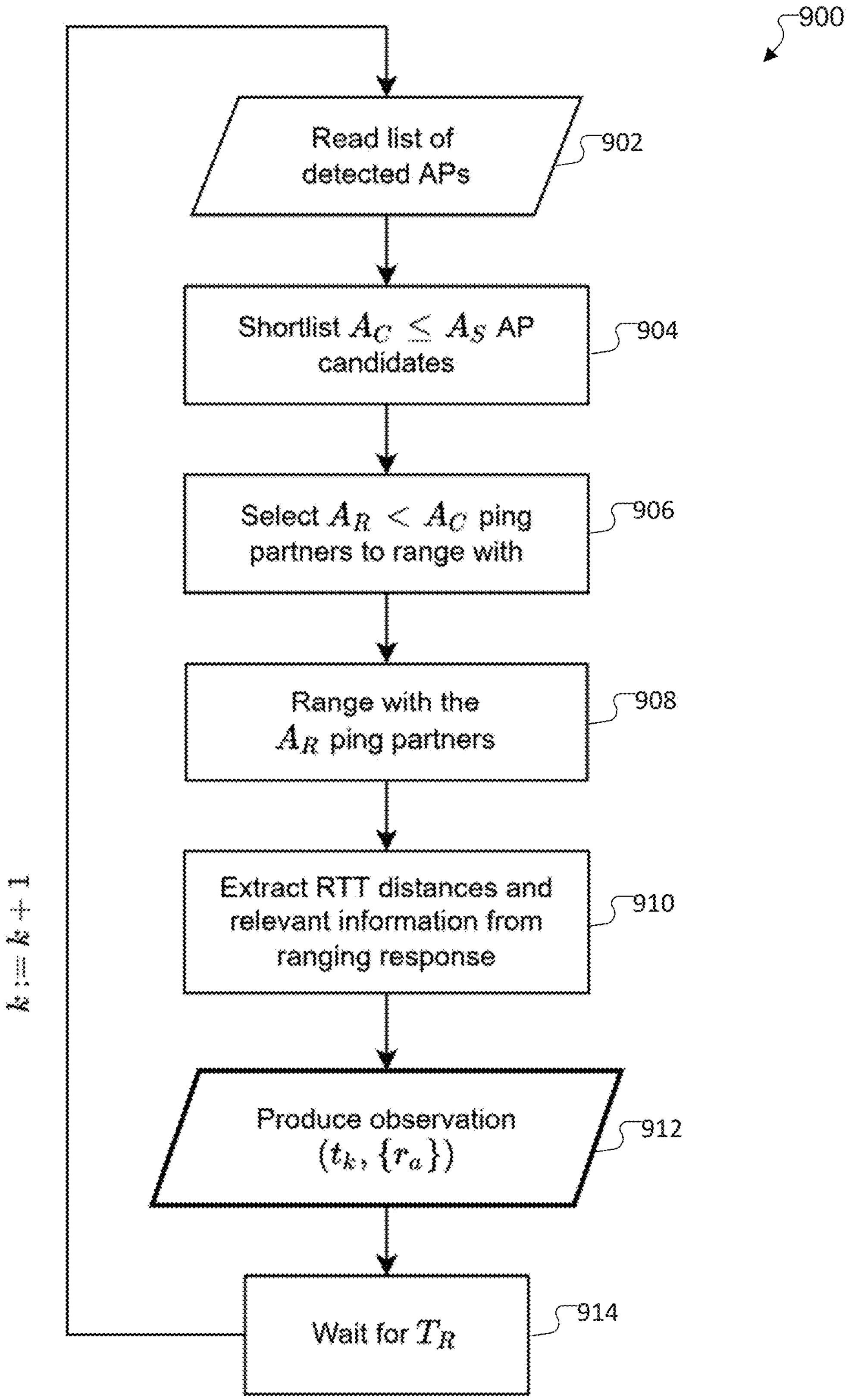
FIG. 9 illustrates an example flow chart showing a ranging operation according to various embodiments of the present disclosure.

FIG. 9 illustrates an example flow chart 900 showing the ranging operation 704 according to various embodiments of the present disclosure. As discussed above, a purpose of the ranging operation 704 is to produce and stream distance measurements to be used for position estimation (e.g., by the positioning operation 706).

As shown in FIG. 9, the ranging operation 704 starts with operation 902, which is performed after the scanning operation 702 generates the detected APs list 712. At operation 902, the STA 111 reads the detected APs list 712.

At operation 904, the STA 111 performs a first round of coarse selection that shortlists a set of APs from the set of $A_S$ APs in the detected APs list 712. The shortlist has a size $A_C \leq A_S$. The STA 111 can perform the coarse selection by choosing the set of $A_C$ APs that are the closest to the STA 111, where distance is determined using the most recent estimate of the position of the STA 111. If no position estimate of the STA 111 is available yet, the value of $A_C$ can be set in different ways. One way is to set $A_C$ to $A_S$, and all detected APs become candidates for the next round of selection. Other ways are to choose the first $A_C$ APs in the detected APs list 712, or simply choose $A_C$ APs arbitrarily.

At operation 906, the STA 111 performs a second round of finer selection that selects a set of $A_R$ ping partners (i.e., APs to range with) out of the $A_C$ candidates in the shortlist generated in operation 904. The STA 111 obtains the set of ping partners by solving a constrained or unconstrained optimization problem involving one or more objective functions and/or constraints, either exactly or by means of an approximation. In some embodiments, the STA 111 selects the set of APs that minimize a two-dimensional or three-dimensional dilution of precision (DOP) metric, as discussed in greater detail below.

At operation 908, the STA 111 prepares and sends ranging requests to the $A_R$ ping partners through the FTM mechanism described earlier, and waits for ranging results.

At operation 910, the STA 111 computes the RTT distances between the STA 111 and the $A_R$ ping partners. For example, in some embodiments, the STA 111 extracts measurements of the distance between the STA 111 and each of the $A_R$ APs obtained through FTM exchanges. Alternatively, the STA 111 extracts the RTT between the STA 111 and each of the APs and applies a scaling factor to convert that into a distance. Additionally, the STA 111 may extract or compute other key information such as the RSSI, RTT distance standard deviation, and other statistics.

At operation 912, the STA 111 produces an observation $(t_k, \{y_a\})$, where $t_k$ is the timestamp at which the ranging response was received by the STA 111, and $\{y_a\}$ is the set of RTT distances from each of the $A_y$ valid APs, i.e., ping partners that responded to the ranging request. Here, $A_V \le A_R$.

At operation 914, the STA 111 waits for a ranging period $T_R$ before going back to operation 902.

An RTT distance is said to be missing if one of the following events happens:

- its corresponding AP was not detected by the Wi-Fi scan.
- its corresponding AP did not make the short list.
- its corresponding AP was not selected to be a ping partner.
- its corresponding AP did not respond to the ranging request.
- there was an error processing the ranging response from its corresponding AP.

Positioning Operation 706.

As discussed above, a purpose of the positioning operation 706 is to estimate the device position for every observation produced by the ranging operation 704. In some embodiments, the positioning operation 706 operation includes two phases: A transitory phase and a steady phase. The transitory phase is the first phase of positioning and is performed upon starting the process 700. The transitory phase establishes an initial value for the position of the STA 111, which can be used as the initial state of an Extended Kalman Filter (EKF) (described in greater detail below). The steady phase determines any lost position produced by the transitory phase. The steady phase produces position estimates as long as the process 700 is being performed. Further details for each phase will now be provided.

Figure 10:
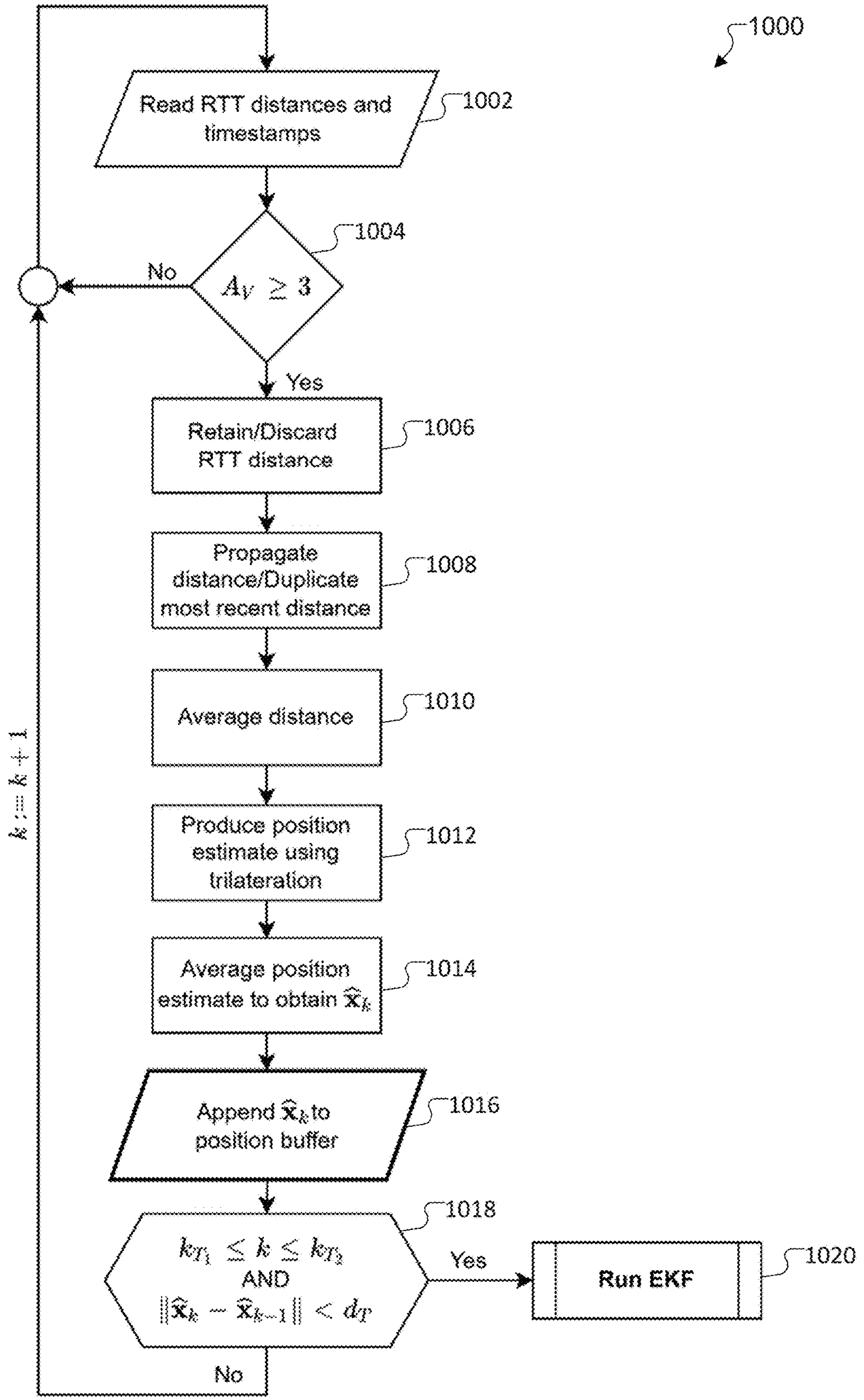
FIG. 10 illustrates an example flow chart showing a transitory phase of the positioning operation according to various embodiments of the present disclosure.

FIG. 10 illustrates an example flow chart showing the transitory phase 1000 of the positioning operation 706 according to various embodiments of the present disclosure. In some embodiments, during the transitory phase 1000, the STA 111 uses trilateration to produce position estimates.

As shown in FIG. 10, at operation 1002, the STA 111 fetches observations produced during the ranging operation 704. The observations can include $A_V$ RTT distances and the timestamps at which the RTT distances were received.

At operation 1004, the STA 111 determines if the value of $A_V \ge 3$. If $A_V < 3$, the positioning operation 706 does not produce a position estimate, and the transitory phase 1000 returns to operation 1002 for fetching of more observations. If $A_V \ge 3$, then the transitory phase 1000 proceeds to operation 1006.

At operation 1006, the STA 111 decides whether to retain or discard the RTT distances on an anchor-by-anchor basis. In one example, the STA 111 can define a fixed or moving range of acceptable values and accept RTT distances lying therein. The range of acceptable values can be AP-specific. A lower bound of such a range can be set to zero to reject negative measurements of distance. An upper bound of such a range can be set to the shortest distance between an AP and the perimeter. This can help eliminate spurious RTT distances that are erroneous.

At operation 1008, the STA 111 decides whether to propagate (in the EKF) the current RTT distance or duplicate an older one on an anchor-by-anchor basis. If the RTT distance from an AP was retained in operation 1006, the RTT distance is propagated in the EKF. Conversely, if the RTT distance from an AP was discarded in operation 1006, or if an RTT distance is missing, the STA 111 can propagate a recent measurement to fill in for the missing data. If the difference between the timestamp of the current observation and the timestamp of the last observation with an RTT distance is smaller than a predefined value, then the last RTT distance is copied. Otherwise, the RTT distance continues to be treated as missing.

At operation 1010, the STA 111 filters the RTT distance on an anchor-by-anchor basis. In one example, the STA 111 can apply a simple moving average (SMA), an exponential moving average (EMA), or a median filter to the sequence of RTT distances from an AP. In the case of a SMA or median filter, a window with a duration of 1-3 seconds can be used. In the case of an EMA, the auto-regression equation $y_k = \alpha \cdot r_k + (1-\alpha) \cdot y_k - 1$, with $\alpha < 0.5$, can be used to filter the RTT distance $r_k$ to obtain $y_k$.

At operation 1012, the STA 111 estimates the current position of the STA 111 using trilateration if the number of RTT distances surviving operations 1004-1010 is greater than or equal to 3.

At operation 1014, the STA 111 averages the position estimate to obtain $\hat{x}_k$, which is a state estimate for the EKF, as described below. At operation 1016, the STA 111 appends $\hat{x}_k$ to a position buffer.

At operation 1018, the STA 111 determines if the position estimate converges after sufficiently many rounds. The convergence criterion can be, for example, that the distance between pairs of consecutive position estimates $\|\hat{x}_k - \hat{x}_{k-1}\|$ is less than some tolerance distance $d_T$, e.g. $d_T = 2$ m, for all rounds k such that $k_{T_1} \le k \le k_{T_2}$, where $k_T$ and $k_{72}$ are two predefined integers, e.g. $k_{T_1} = 10$, $k_{T_2} = 20$. Instead of framing the round index k between two integers, the timestamp $t_k$ corresponding to round k can alternatively be framed between two predefined values.

If the STA 111 determines at operation 1018 that the position estimate converges after sufficiently many rounds, then the transitory phase 1000 moves to operation 1020, where the STA 111 uses the last position estimate produced during the transitory phase 1000 to initialize and run the EKF, which effectively starts the steady phase.

Otherwise, if the STA 111 determines at operation 1018 that the position estimate does not converge (i.e., if there is a round k* where $\|\hat{x}_k - \hat{x}_{k-1}\| > d_T$), then the STA 111 rolls over the interval $[k_{T_1}, k_{T_2}]$ by k* rounds, i.e. $k_{T_1} = 1 + k^*$ and $k_{T_2} := 1 + k^* + (k_{T_2} - k_{T_1})$, and the STA 111 remains in the transitory phase 1000.

Overview of Extended Kalman Filter (EKF)

A Kalman filter recursively estimates the state of a dynamical system from a sequence of measurements obtained over time and an assumption of state trajectory. The Kalman filter assumes an underlying system that is modeled by two linear equations: (i) a state transition/motion equation, and (ii) a measurement/observation equation.

The motion equation describes the evolution of the state of the system and relates the current state to a previous state, such as by the following:

$$x_k = A_k x_{k-1} + B_k u_k + v_k,$$

where $x_k$ is the current state, $x_{k-1}$ is the last state, $A_k$ is the state transition matrix, $u_k$ is the current input, $B_k$ is the control/input matrix, and $v_k \sim N(0, Q_k)$ is the process noise which represents uncertainty in state.

The measurement equation relates the current observation to the current state, such as by the following:

$$y_k = H_k x_k + w_k,$$

where $y_k$ is the latest observation, $H_k$ is the observation matrix, and $w_k \sim N(0, Q_k)$ is the observation noise.

At each time index k, the Kalman filter estimates the state of the system by applying a prediction step followed by an update step. The outcome of these two steps is the state estimate $\hat{x}_k$ at time index k and its covariance matrix $P_k$ which are in turn used to estimate the states at later points in time.

In the prediction step, the Kalman filter predicts the current state $\hat{x}_{k|k-1}$ (a priori estimate) from the most recent state estimate $\hat{x}_{k-1}$, its covariance $P_{k-1}$, and any inputs using the motion equation as follows:

$$\hat{x}_{k|k-1} = A_k \hat{x}_{k-1} + B_k u_k,$$

$$P_{k|k-1} = A_k P_k A_k^* + Q_k,$$

In the update step, the Kalman filter uses the latest observation to update its prediction and obtain the (a posteriori) state estimate $\hat{x}_k$ and its covariance $P_k$ as follows:

$$\hat{x}_k = \hat{x}_{k|k-1} + K_k(y_k - H_k \hat{x}_{k|k-1}),$$

$$P_k = (I - K_k H_k) P_{k|k-1},$$

where $K_k$ is the Kalman gain and is a function of the a priori estimate covariance $P_{k|k-1}$, observation matrix $H_k$, and observation noise covariance matrix $R_k$.

The EKF is an adaptation of the Kalman filter for handling non-linearities in the motion or measurement models. If the motion or measurement equations are not linear, the Kalman filter could not be used unless these equations are linearized. Consider the following non-linear motion and measurement equations:

$$x_k = f_k(x_{k-1}, u_k) + v_k,$$

$$y_k = h_k(x_k) + w_k,$$

where $f_k$ and $h_k$ are non-linear functions. The EKF applies the prediction and update steps as follows:

Prediction Step:

$$\hat{x}_{k|k-1} = f_k(\hat{x}_{k-1}, u_k),$$

$$P_{k|k-1} = F_k P_k F_k^* + Q_k,$$

$$\text{where } F_k = \frac{\partial f_k(x, u)}{\partial x}\Big|_{x=\hat{x}_{k-1}, u=u_k}.$$

Update Step:

$$\hat{x}_k = \hat{x}_{k|k-1} + K_k(y_k - H_k \hat{x}_{k|k-1}),$$

$$P_k = (I - K_k H_k) P_{k|k-1},$$

$$\text{where } F_k = \frac{\partial h_k(x)}{\partial x}\Big|_{x=\hat{x}_{k-1}}.$$

The state estimate $\hat{x}_k$ and its covariance $P_k$ are propagated to track the state of system. In the context of positioning, the state is the device position. In the context of Wi-Fi RTT indoor positioning, the observations are RTT distance measurements.

Random Walk EKF.

In some embodiments, in the positioning operation 706, the STA 111 uses a random walk extended Kalman filter (EKF-RW) to estimate the position of the STA 111. The STA 111 assumes the state-space model defined by two models: a kinematic-free motion model and a distance-dependent measurement model. The motion model (or state transition model), which relates the current position to the last position, is defined according to the following equation:

$$x_k = x_{k-1} + v_k,$$

where $x_k$ denotes the current state, $x_{k-1}$ denotes the last state, and $v_k$ denotes an unknown step size. The unknown step $v_k$ is defined according to $v_k \sim N(0, Q)$, where $Q_k = \text{diag}([(\sigma_p \Delta t_k)^2, (\sigma_p \Delta t_k)^2])$, $\Delta t_k = t_k - t_{k-1}$ is the duration between two consecutive observation timestamps, and $\sigma_p$ is a model parameter representing an average speed.

The measurement model (or observation model), which relates the current observation, or set of RTT distances, to the current position, is defined according to the following equation:

$$y_{a,k} = d(x_k, x_a) + w_k,$$

where $y_a$, k is the RTT distance from AP a, and AP a is one of the valid APs. The term $d(x_k, x_a)$ denotes the distance between the STA 111, with a current position $x_k$, and AP a, and $w_k \sim N(\mu_k, R_k)$ denotes the observation noise. As the distance function d(.,.) is not linear, it needs to be linearized so estimation can continue to take place in the efficient Kalman filter framework. Accordingly, the measurement model is linearized as follows:

$$y_k = H_k x_k + w_k,$$

where the observation vector $y_k$ stacks the RTT distances $\{y_a\}$, and the matrix $H_k$ is such that an element at its a-th row is j-th column (corresponds to AP a and coordinate $x_j$):

$$[H_k]_{a,j} = \frac{\partial d(x, x_a)}{\partial x_j}\Big|_{x_j=\hat{x}_{k|k-1,j}}.$$

Distance-Dependent Measurement Model

In some embodiments, in the positioning operation 706, the STA 111 uses a distance-dependent measurement model to enhance estimation accuracy. In one example, the elements of the measurement noise vector $w_k$ each have a mean and a variance that vary with the RTT distance from the corresponding AP: a shorter distance corresponds to a smaller mean and variance, and a longer distance corresponds to a larger mean and variance. For example, the measurement noise mean $\mu_M(y_a)$ and variance $$\sigma_M^2$$

$(y_a)$ corresponding to an arbitrary AP a can be linear in the RTT distance, piece-wise linear, quadratic, polynomials, or any other monotonically increasing function that suitably fits the data explaining observation errors vs. RTT distances. Instead of all the RTT distance measurements from all of the APs sharing the same noise statistics $\mu_M(y)$ and $$\sigma_M^2$$

(y), every AP can be given its own unique mean and variance functions.

During the EKF update step, the STA 111 uses the RTT distance measurement $y_a$ to compute the mean $\mu_M(y_a)$ and the variance $$\sigma_M^2$$

$(y_a)$ to compute the Kalman gain.

Figure 11:
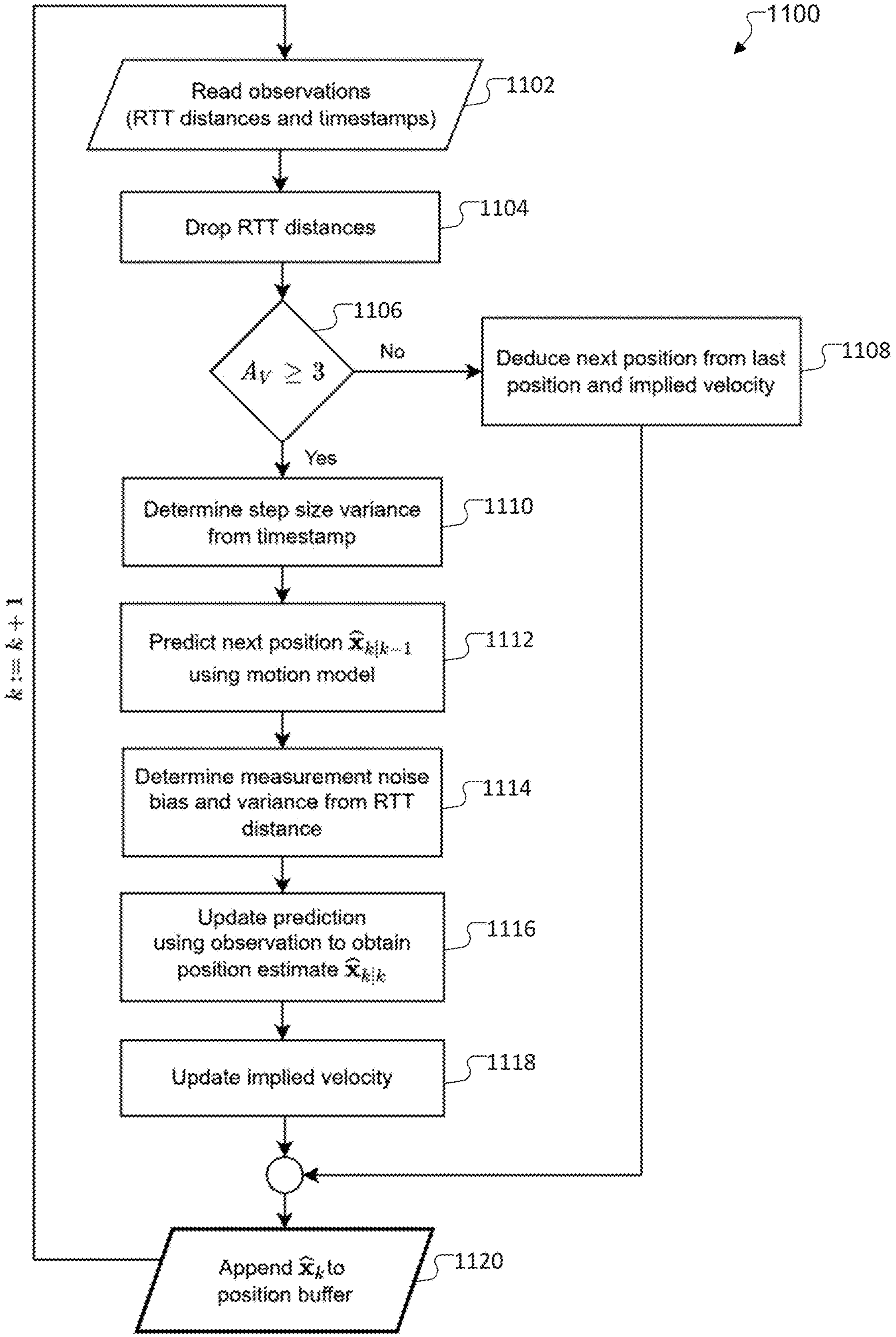
FIG. 11 illustrates an example flow chart showing a steady phase of the positioning operation according to various embodiments of the present disclosure.

FIG. 11 illustrates an example flow chart showing the steady phase 1100 of the positioning operation 706 according to various embodiments of the present disclosure. In some embodiments, the STA 111 transitions to the steady phase 1100 as soon as STA 111 has established an accurate and precise position estimate.

As shown in FIG. 11, at operation 1102, the STA 111 fetches observations produced during the ranging operation 704. The observations can include $A_y$ RTT distances and the timestamps at which the RTT distances were received.

At operation 1104, the STA 111 drops one or more RTT distance measurements. This is similar to operation 1006 of the transitory phase 1000, but the retention/rejection criteria can be different. For example, if for a given AP a, the RTT distance $y_a$ is less than a predefined maximum distance $d_{max}$, then the distance measurement is dropped, and $A_V$ is decremented. The maximum distance $d_{max}$ can be chosen to be the maximum attainable physical distance between any AP and any feasible device position. The maximum attainable distance can further be scaled upwards to account for over-estimation.

At operation 1106, the STA 111 determines if the number of surviving RTT distances $A_V>3$. If $A_V<3$, the steady phase 1100 proceeds to operation 1108 for deducing the next position. If $A_V \geq 3$, then the steady phase 1100 proceeds to operation 1110.

At operation 1108, the STA 111 deduces the next position as an offset of the last-produced position estimate using implied velocity $U_k$. Accordingly, the next position is predicted as follows:

$$\hat{x}_{k|k^*} = \hat{x}_{k^*} + (t_k - t_{k^*}) \cdot u_k,$$

where $k^+$ is the index of the most recent estimate $\hat{x}_{k^+}$ that was obtained with $A_V \geq 3$ RTT distances at time $t_{k^-}$. The implied velocity $U_k$ is computed according to operation 1118, discussed below.

At operation 1110, the STA 111 sets the variance $Q_k$ of the step size $v_k$ as $Q_k = \text{diag}([(\sigma_p \Delta t_k)^2, (\sigma_p \Delta t_k)^2])$, where $\Delta t_k = t_k - t_k$.

At operation 1112, the STA 111 predicts the next position $\hat{x}_{k|k-1}$ using the latest estimate $\hat{x}_k$ and the motion model, and computes the a priori position covariance matrix $P_{k|k-1}$, according to the EKF prediction step, as follows:

$$\hat{x}_{k|k-1} = \hat{x}_{k-1}$$

$$P_{k|k-1} = P_k + Q_k$$

At operation 1114, the STA 111 computes the observation noise mean and variance for each of the $A_y$ surviving observations according to the distance-dependent measurement model by evaluating the functions $\mu_{M,a,k}(y_a, k)$ and $$DOP(x, y; S) = \text{trace}\left(H_S^T H_S\right)^{-1},$$

$(y_a, k)$, which are predefined functions.

At operation 1116, the STA 111 updates the position estimate to produce the a posteriori position estimate $\hat{x}_k$ and its covariance matrix $P_k$ by combining the predicted position $\hat{x}_{k|k-1}$ with the RTT distance measurements $\{y_a\}$, according to the EKF update step, as follows:

$$\hat{x}_k = \hat{x}_{k|k-1} + K_k\left(y_k - \mu_{M,k} - H_k \hat{x}_{k|k-1}\right)$$

-continued $$P_k = (I - K_k H_k) P_{k|k-1},$$

where $K_k$ is the Kalman gain and is a function of the distance-dependent measurement noise variances $$\{\sigma^2_{M,\alpha,k}(y_\alpha, k)\}_\alpha,$$

and $\mu_{M,k}$ is a column vector whose elements are the distance-dependent noise means $$\{\sigma^2_{M,\alpha,k}(y_\alpha, k)\}_\alpha.$$

At operation 1118, the STA 111 updates the implied velocity $u_k$ as follows:

$$\tilde{u}_k = \frac{1}{t_k - t_{k-N_u}}(\hat{x}_k - \hat{x}_{k-N_u}),$$

where $N_u$ is chosen such that $t_k - t_{k-N_u}$ is in the order of a few seconds. As shown in FIG. 11, $\hat{u}_k$ is filtered/averaged (e.g., simple moving average, exponential moving average) every estimation step k to obtain $u_k$. In some embodiments, instead of deducing the velocity from variations in the position estimate, the STA 111 can estimate the velocity from sensors in the STA's IMU (e.g., the accelerometer, gyroscope, and magnetometer).

At operation 1120, the STA 111 appends $R_k$ to a position buffer, and the STA 111 repeats the steady phase 1100 for another estimation step k.

Figure 12:
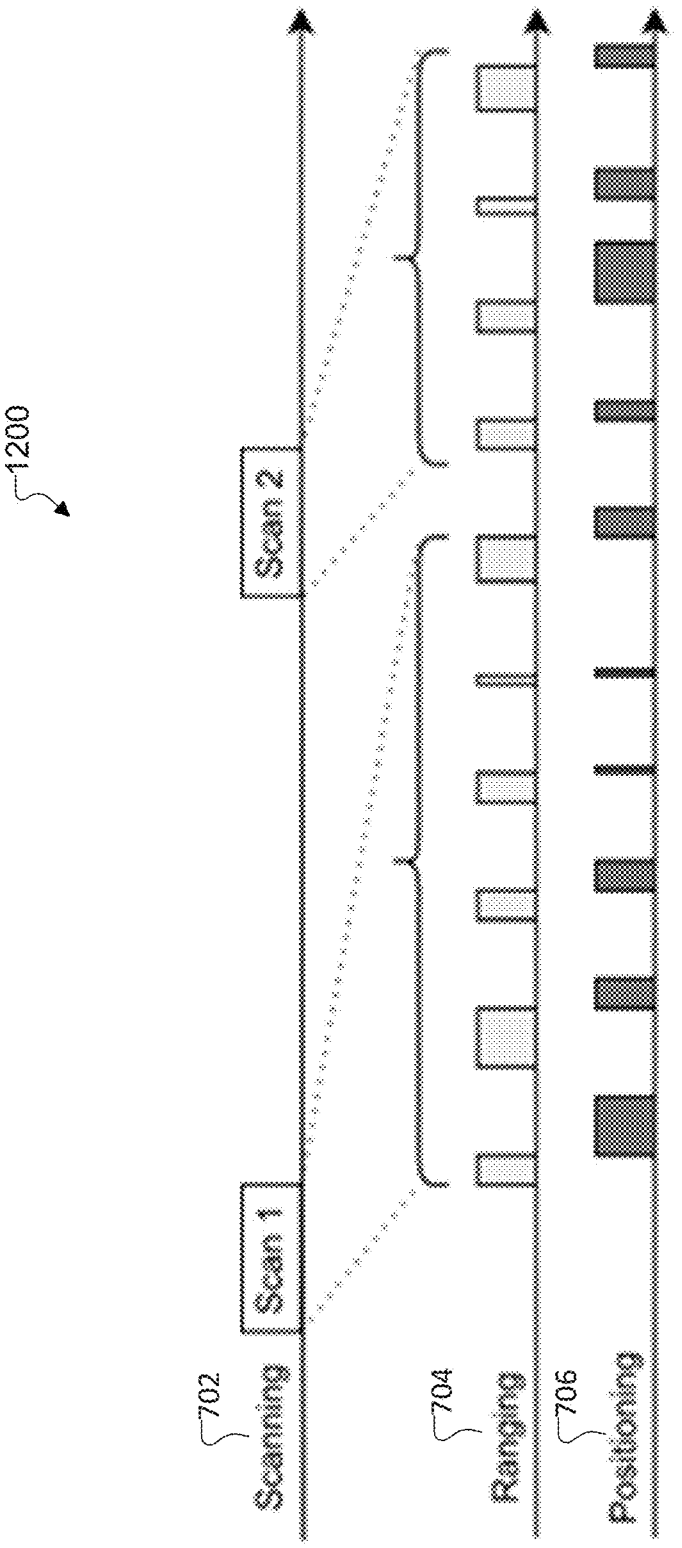
FIG. 12 illustrates an example time diagram showing the temporal relationships of the scanning, ranging, and positioning operations of the process of FIG. 7 according to various embodiments of the present disclosure.

FIG. 12 illustrates an example time diagram 1200 showing the temporal relationships of the scanning, ranging, and positioning operations of the process 700 according to various embodiments of the present disclosure. As shown in FIG. 12, the scanning operation 702 is performed periodically. After each scanning operation 702, one or more ranging operations 704 are performed, followed by a positioning operation 706 after each ranging operation 704.

Dilution of Precision for Ping-Partner Selection

Figure 13B:
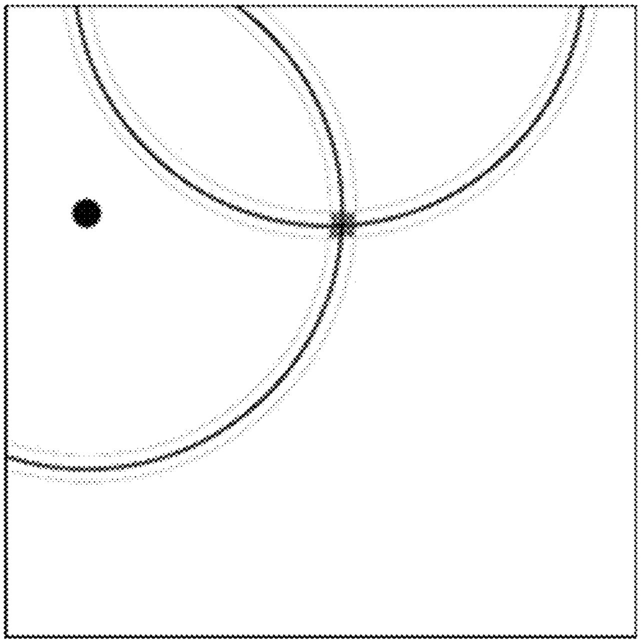
FIGS. 13A and 13B illustrate two examples of dilution of precision (DOP)
Figure 13A:
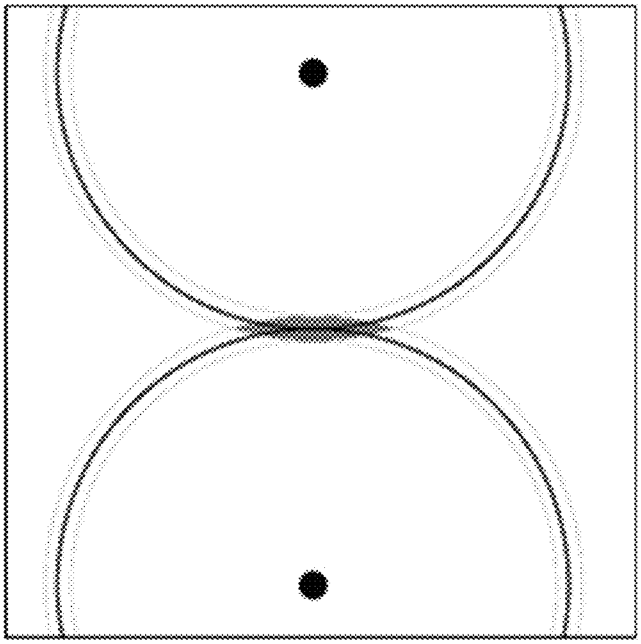

A common performance precursor used in satellite navigation systems is the dilution of precision (DOP). The DOP helps predict the error bounds of the position estimate as a function of the relative position of the moving object with respect to the position of the anchor points (or reference points) and their ranging errors. Mathematically, the DOP at position (x, y) is defined as:

$$DOP(x, y) = \text{trace}(H^T H)^{-1},$$

where the a-th row of matrix A×2 matrix H is in turn defined as:

$$[H]_{a,:} = \left[ \frac{x}{d_a(x, y)} \quad \frac{y}{d_a(x, y)} \right],$$

where $d_a(x, y)$ is the distance between the device and the a-th anchor point. FIGS. 13A and 13B illustrate two examples of DOP. The DOP in FIG. 13A is greater left than the DOP in FIG. 13B.

In some embodiments, during the ranging operation 704 (e.g., in operation 906), the STA 111 can use DOP to select the best set of ping partners S from the set of APs 1 . . . A. For a given subset S of APs, the DOP at position (x, y) becomes:

$$[H]_{\alpha,:} = \left[ \frac{x}{d_\alpha(x, y)} \frac{y}{d_\alpha(x, y)} \right],$$

where $H_s = [H]_{\alpha \in S}$.

The following describes two variations of using DOP for ping-partner selection.

In one variation, before making a ranging request, the STA 111 checks if the ranging index k is such that k mod $I_S = 0$ for a selection interval $I_S$. If the condition is false, the ranging operation 704 proceeds to operation 906. Otherwise, the STA 111 uses the most recently-selected set of ping partners to range with. The STA 111 also determines the subset of APs S* of size $A_p$, $A_p \leq A_S$, that corresponds to the minimal DOP. This can be solved optimally through exhaustive search, or approximately through a greedy algorithm or a heuristic.

In another variation, on startup, the STA 111 partitions the two-dimensional navigable area into an array of L×W square cells of size $\delta_p$. The STA 111 determines, for each cell (l, w), the optimal AP subset S* that minimizes DOP($l\delta_p$, $w\delta_p$; S). The STA 111 also stores, for each cell (l, w), the optimal subset S* in a corresponding entry in a lookup table of the same size of the partition. Before every ranging request, the STA 111 quantizes the position (x, y) into a cell (l, w), looks up the optimal AP subset for the cell, and makes a ranging request to the APs.

Although FIGS. 7 through 13B illustrate examples of a process 700 for device-based indoor positioning and related details, various changes may be made to FIGS. 7 through 13B. For example, various components in FIGS. 7 through 13B could be combined, further subdivided, or omitted and additional components could be added according to particular needs. In addition, while shown as a series of steps, various operations in FIGS. 7 through 13B could overlap, occur in parallel, occur in a different order, or occur any number of times. In another example, steps may be omitted or replaced by other steps.

Figure 14:
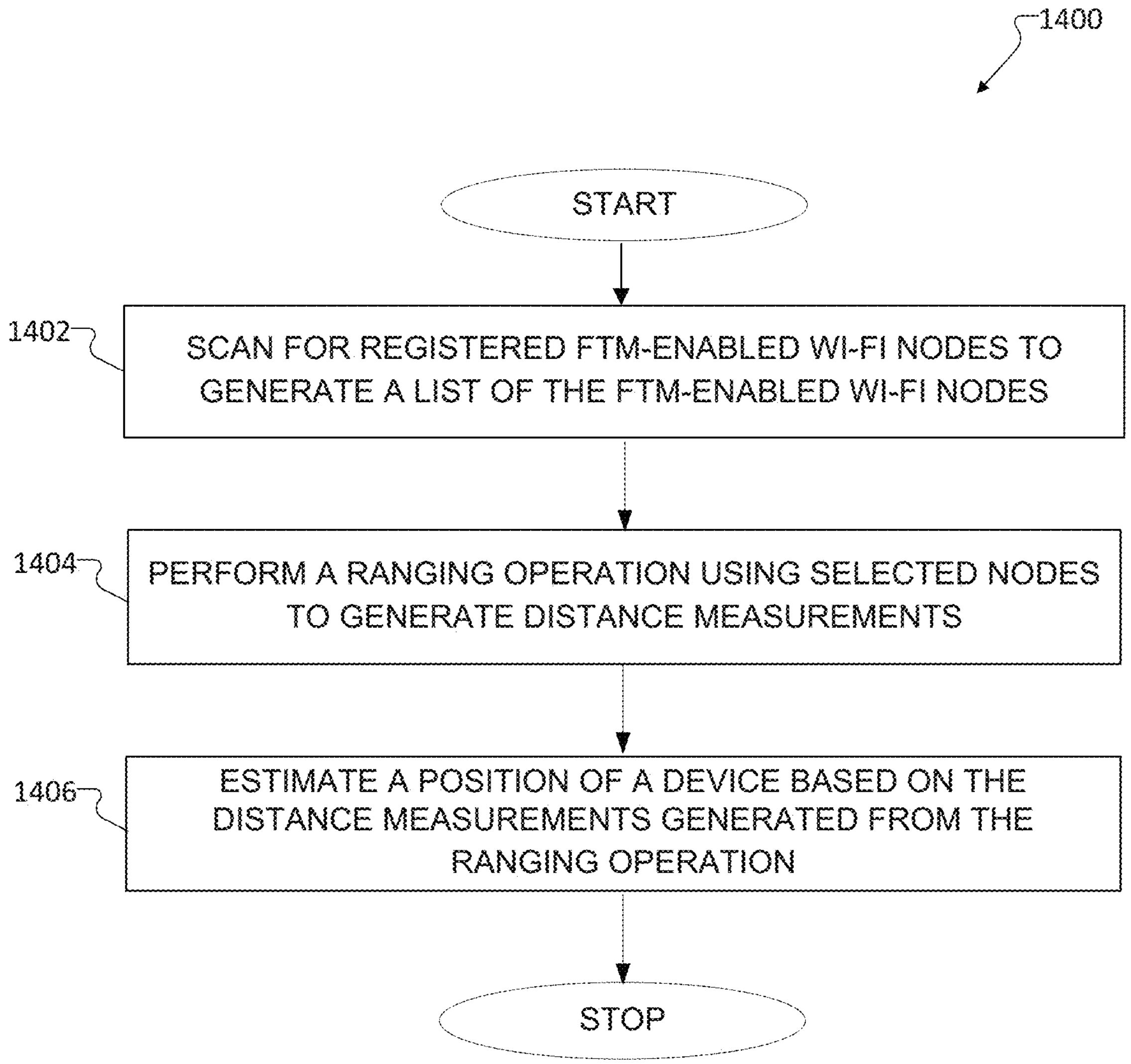
FIG. 14 illustrates a flow chart of a method for device-based indoor positioning according to various embodiments of the present disclosure.

FIG. 14 illustrates a flow chart of a method 1400 for device-based indoor positioning according to various embodiments of the present disclosure, as may be performed by one or more components of the wireless network 100 (e.g., the STA 111). The embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

As illustrated in FIG. 14, the method 1400 begins at step 1402. At step 1402, a scan is performed for registered FTM-enabled Wi-Fi nodes to generate a list of the FTM-enabled Wi-Fi nodes. This could include, for example, the STA 111 performing the scanning operation 702 as shown in FIGS. 7 and 8.

At step 1404, a ranging operation is performed by (i) selecting nodes to range with from the list of the FTM-enabled Wi-Fi nodes and (ii) processing ranging responses from the selected nodes to generate distance measurements.

This could include, for example, the STA 111 performing the ranging operation 704 as shown in FIGS. 7 and 9.

At step 1406, a position of a device is estimated based on the distance measurements generated from the ranging operation. This could include, for example, the STA 111 performing the positioning operation 706 as shown in FIGS. 7, 10, and 11.

Although FIG. 14 illustrates one example of a method 1400 for device-based indoor positioning, various changes may be made to FIG. 14. For example, while shown as a series of steps, various steps in FIG. 14 could overlap, occur in parallel, occur in a different order, or occur any number of times.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:

scanning for registered fine-time measurement (FTM)-enabled Wi-Fi nodes to generate a list of the FTM-enabled Wi-Fi nodes that includes a set of detected FTM-enabled Wi-Fi nodes from a list of registered FTM-enabled Wi-Fi nodes deployed for positioning;

performing a ranging operation by (i) selecting nodes to range with from the list of the FTM-enabled Wi-Fi nodes and (ii) processing ranging responses from the selected nodes to generate distance measurements, wherein selecting nodes to range with comprises: (i) performing a coarse selection that shortlists a set of candidate nodes from the list of FTM-enabled Wi-Fi nodes based on proximity to a most recent position estimate of a device and (ii) performing a fine selection that selects ping partners from the shortlisted candidate nodes by reducing a dilution of precision (DOP) metric; and estimating a position of the device based on the distance measurements generated from the ranging operation.

2. The method of claim 1, wherein scanning for the registered FTM-enabled Wi-Fi nodes comprises:

obtaining the list of registered FTM-enabled Wi-Fi nodes;

scanning for Wi-Fi nodes to determine if any of the registered FTM-enabled Wi-Fi nodes can be detected;

updating a list of detected Wi-Fi nodes based on the registered FTM-enabled Wi-Fi nodes that are detected to generate the list of the FTM-enabled Wi-Fi nodes; and repeating the scanning and updating after a predetermined waiting period or in response to a scanning request.

3. The method of claim 2, wherein the ranging operation further comprises:

selecting a set of ping partners from the list of the FTM-enabled Wi-Fi nodes, the set of ping partners comprising the selected nodes to range with;

ranging with the set of ping partners to obtain the ranging responses;

generating round-trip time (RTT) distance measurements between the device and the ping partners based on the ranging responses;

generating an observation associated with a time based on the RTT distance measurements; and repeating the selecting, ranging, generating the RTT distance measurements, and generating the observation after a second predetermined waiting period.

4. The method of claim 1, wherein estimating the position of the device comprises:

performing a transitory phase that establishes an initial estimate of the position of the device; and performing a steady phase that revises the initial estimate of the position of the device, wherein the steady phase follows the transitory phase.

5. The method of claim 4, wherein the transitory phase uses trilateration to establish the initial estimate of the position of the device.

6. The method of claim 4, wherein the steady phase uses a kinematic-free motion model and a distance-dependent measurement model of the device to revise the initial estimate of the position of the device into an updated estimate of the position of the device.

7. The method of claim 1, wherein the FTM-enabled Wi-Fi nodes comprise access points (APs) configured to communicate with the device.

8. A device comprising:

a transceiver; and a processor operably connected to the transceiver, the processor configured to:

scan for registered fine-time measurement (FTM)-enabled Wi-Fi nodes to generate a list of the FTM-enabled Wi-Fi nodes that includes a set of detected FTM-enabled Wi-Fi nodes from a list of registered FTM-enabled Wi-Fi nodes deployed for positioning;

perform a ranging operation by (i) selecting nodes to range with from the list of the FTM-enabled Wi-Fi nodes and (ii) processing ranging responses from the selected nodes to generate distance measurements, wherein to select nodes to range with the processor is further configured to: (i) perform a coarse selection that shortlists a set of candidate nodes from the list of FTM-enabled Wi-Fi nodes based on proximity to a most recent position estimate of the device and (ii) perform a fine selection that selects ping partners from the shortlisted candidate nodes by reducing a dilution of precision (DOP) metric; and estimate a position of the device based on the distance measurements generated from the ranging operation.

9. The device of claim 8, wherein to scan for the registered FTM-enabled Wi-Fi nodes, the processor is configured to:

obtain the list of registered FTM-enabled Wi-Fi nodes;

scan for Wi-Fi nodes to determine if any of the registered FTM-enabled Wi-Fi nodes can be detected;

update a list of detected Wi-Fi nodes based on the registered FTM-enabled Wi-Fi nodes that are detected to generate the list of the FTM-enabled Wi-Fi nodes; and repeat the scan and update after a predetermined waiting period or in response to a scanning request.

10. The device of claim 9, wherein to perform the ranging operation, the processor is further configured to:

select a set of ping partners from the list of the FTM-enabled Wi-Fi nodes, the set of ping partners comprising the selected nodes to range with;

range with the set of ping partners to obtain the ranging responses;

generate round-trip time (RTT) distance measurements between the device and the ping partners based on the ranging responses;

generate an observation associated with a time based on the RTT distance measurements; and repeat the select, range, generate the RTT distance measurements, and generate the observation after a second predetermined waiting period.

11. The device of claim 8, wherein to estimate the position of the device, the processor is further configured to:

perform a transitory phase that establishes an initial estimate of the position of the device; and perform a steady phase that revises the initial estimate of the position of the device, wherein the steady phase follows the transitory phase.

12. The device of claim 11, wherein the transitory phase uses trilateration to establish the initial estimate of the position of the device.

13. The device of claim 11, wherein the steady phase uses a kinematic-free motion model and a distance-dependent measurement model of the device to revise the initial estimate of the position of the device into an updated estimate of the position of the device.

14. The device of claim 8, wherein the FTM-enabled Wi-Fi nodes comprise access points (APs) configured to communicate with the device.

15. A non-transitory computer readable medium comprising program code that, when executed by a processor of a device, causes the device to:

scan for registered fine-time measurement (FTM)-enabled Wi-Fi nodes to generate a list of the FTM-enabled Wi-Fi nodes that includes a set of detected FTM-enabled Wi-Fi nodes from a list of registered FTM-enabled Wi-Fi nodes deployed for positioning;

perform a ranging operation by (i) selecting nodes to range with from the list of the FTM-enabled Wi-Fi nodes and (ii) processing ranging responses from the selected nodes to generate distance measurements, wherein selecting nodes to range with comprises: (i) performing a coarse selection that shortlists a set of candidate nodes from the list of FTM-enabled Wi-Fi nodes based on proximity to a most recent position estimate of the device and (ii) performing a fine selection that selects ping partners from the shortlisted candidate nodes by reducing a dilution of precision (DOP) metric; and estimate a position of the device based on the distance measurements generated from the ranging operation.

16. The non-transitory computer readable medium of claim 15, wherein the program code that causes the device to scan for the registered FTM-enabled Wi-Fi nodes comprises program code to:

obtain the list of registered FTM-enabled Wi-Fi nodes;

scan for Wi-Fi nodes to determine if any of the registered FTM-enabled Wi-Fi nodes can be detected;

update a list of detected Wi-Fi nodes based on the registered FTM-enabled Wi-Fi nodes that are detected to generate the list of the FTM-enabled Wi-Fi nodes; and repeat the scan and update after a predetermined waiting period or in response to a scanning request.

17. The non-transitory computer readable medium of claim 16, wherein the program code that causes the device to perform the ranging operation further comprises program code to:

select a set of ping partners from the list of the FTM-enabled Wi-Fi nodes, the set of ping partners comprising the selected nodes to range with;

range with the set of ping partners to obtain the ranging responses;

generate round-trip time (RTT) distance measurements between the device and the ping partners based on the ranging responses;

generate an observation associated with a time based on the RTT distance measurements; and repeat the select, range, generate the RTT distance measurements, and generate the observation after a second predetermined waiting period.

18. The non-transitory computer readable medium of claim 15, wherein the program code that causes the device to estimate the position of the device comprises program code to:

perform a transitory phase that establishes an initial estimate of the position of the device; and perform a steady phase that revises the initial estimate of the position of the device, wherein the steady phase follows the transitory phase.

19. The non-transitory computer readable medium of claim 18, wherein the transitory phase uses trilateration to establish the initial estimate of the position of the device.

20. The non-transitory computer readable medium of claim 18, wherein the steady phase uses a kinematic-free motion model and a distance-dependent measurement model of the device to revise the initial estimate of the position of the device into an updated estimate of the position of the device.

* * * * *